United States Patent [19]

Teal et al.

[11] Patent Number: 5,218,814
[45] Date of Patent: Jun. 15, 1993

[54] ENGINE AND TRANSAXLE MODULE

[75] Inventors: Richard D. Teal, Horicon; Wayne R. Hutchison, Mayville; Jon M. Patterson, Wauwatosa; Terry D. Hardesty, Columbus; Eugene G. Hayes, Beaver Dam, all of Wis.; David R. Daniel, Midland, Mich.; Michael J. Coffey, Sanford, Mich.; Steven C. Wasson; Luis Lorenzo, both of Midland, Mich.

[73] Assignee: Deere & Company, Moline, Ill.

[21] Appl. No.: 715,172

[22] Filed: Jun. 14, 1991

[51] Int. Cl.$^5$ .......................................... A01D 34/64
[52] U.S. Cl. ............................ 56/14.7; 56/DIG. 6; 56/DIG. 22; 180/291
[58] Field of Search ................... 56/14.7, 10.1, 15.8, 56/DIG. 6, DIG. 22; 74/607, 700; 180/291, 299

[56] References Cited

U.S. PATENT DOCUMENTS

| | | | |
|---|---|---|---|
| 2,860,716 | 11/1958 | Flock | 180/19 |
| 3,122,944 | 3/1964 | Boehner et al. | 74/700 |
| 4,026,377 | 5/1977 | Jones | 180/296 |
| 4,267,895 | 5/1981 | Eggert, Jr. | 180/291 X |
| 4,311,204 | 1/1982 | Shupert | 56/14.7 X |
| 4,679,382 | 7/1987 | Saruhashi et al. | 56/10.1 |
| 4,733,522 | 3/1988 | Johansson | 56/DIG. 22 X |
| 4,771,856 | 9/1988 | Hutchison et al. | 180/333 |
| 4,969,319 | 11/1990 | Hutchison et al. | 56/14.7 |

OTHER PUBLICATIONS

"Preliminary Feasibility Study" containing information generated and provided by employees of The Dow Chemical Co. and Deere & Co. pp. 1-205, including 4 (four) sub-lettered pages, co-generated prior to 1 Sep. 1989 and confidentially shared between Dow and Deere in the U.S.
John Deere Horicon Works, brochure entitled "John Deere Riding Mowers", published in 1990, front cover and pp. 4 and 5.
Brochure entitled "Systems For Automated Manufacture" published by General Electric Co., front cover and pp. 2 and 3.
Patent Abstracts of Japan, vol. 7, No. 271, Dec. 1983.

*Primary Examiner*—Terry Lee Melius

[57] ABSTRACT

A horizontally extending plate-like member having a power source, transaxle and belt arrangement coupled thereto. The member mounts the power source, transaxle, and belt arrangement to a vehicle frame, and establishes a lever arm between first and second coupling means for transferring relatively small concentrated loads to the vehicle frame. The power source, transaxle, belt arrangement and member can be removed from the vehicle frame for service as a single unit or module.

19 Claims, 5 Drawing Sheets

ENGINE AND TRANSAXLE MODULE

BACKGROUND OF THE INVENTION

1. Field of the Invention

The invention relates to mechanisms for coupling an engine and transaxle to a vehicle frame.

2. Description of the Related Art

Conventional powered vehicles such as lawn and garden tractors provide a power source or engine, and a transaxle that transmits rotational motion from the engine to ground engaging driven wheels. When the transaxle transmits torque to the driven wheels to drive the vehicle forward, an equal and opposite torque load is transmitted to the frame of the vehicle. For example, the transaxles of rear wheel drive vehicles will urge the vehicle frame to rotate upwardly and rearwardly about the rear wheels in response to the vehicle being driven forwardly. A relatively large torque load is thereby transferred to the vehicle frame at the point where the transaxle is coupled to the frame. The vehicle is typically prevented from rotating upwardly and rearwardly by the weight of the vehicle itself. Vehicle frame structures must be strong enough to withstand the large concentrated loads that result from driving torque being applied to the driven wheels. Conventional vehicle frames must also be sufficiently strong to carry the weight of vehicle components such as the engine. Many conventional vehicle frames are manufactured from relatively rigid and strong metal materials such as steel, and therefore easily absorb large concentrated force loads associated with driving torque and engine weight. However, because conventional frame structures must be relatively strong, they are relatively expensive to manufacture and assemble.

A first type of conventional lawn and garden vehicle provides an engine and transaxle that are each separately attached or coupled to the frame. Because the two components are separately carried by the frame, interchangeability of components is possible. Therefore, different sizes of engines, or different types of transaxles can be installed on identical frames during manufacture. However, removal of the engine or transaxle for servicing is relatively difficult since the two parts must be disconnected from each other to allow removal of either component from the vehicle Conventional vehicles often provide a series of belts and pulleys between the engine and transaxle that must be disconnected for removal of either the engine or the transaxle Many engine or transaxle service operations would not otherwise require the two components to be uncoupled from each other, and therefore the process of disconnecting the components from one another is often unnecessary and needlessly time consuming other then to allow removal from the vehicle. This type of conventional vehicle transfers relatively large forces to the frame as a result of driving torque, and may transfer a large portion of the weight of the engine directly to the frame. Therefore strong materials such as steel that can withstand relatively large concentrated loads are typically utilized to manufacture the vehicle frame.

A second type of vehicle provides a unitized engine and transaxle. Vehicles of this type provide engines and transaxles that are integral with each other or unitized, and therefore can be removed from the vehicle without being uncoupled from each other. However, since they are formed integral with each other, interchangeability of components is eliminated. Some of the vehicles of this type position the engines's center of gravity directly over the axle such that the weight of the engine is largely transferred to the axle and wheels rather than to the frame. Therefore the force corresponding to the weight of the engine that is applied to the frame is reduced. However, the concentrated load applied to the frame that results from driving torque being transmitted to the wheels typically remains relatively large, and the frame must therefore be manufactured from a relatively strong material to withstand high concentrated loads.

The two types of vehicles discussed above therefore require the use of a frame that can withstand large concentrated loads due to the torque associated with driving the vehicle. Conventional vehicles may also require the vehicle frame to withstand relatively large concentrated loads associated with the weight of the engine. The vehicles discussed above are therefore particularly unsuitable for use with a light-weight frame structure made of an inexpensive material such as plastic that may not be capable of withstanding high concentrated loads.

It would therefore be desirable to provide a mounting mechanism that transfers relatively small concentrated loads to the frame that result from acceleration of the vehicle. Such a mounting mechanism would allow the vehicle frame structure to be manufactured from relatively inexpensive materials such as plastic. It would also be desirable for such a mechanism to allow the engine to be positioned such that the center of gravity of the engine is vertically aligned with the axle to thereby transfer its weight downwardly to the ground through the axle and ground engaging wheel, rather than through the frame. It would be desirable to provide a mechanism that mounts an engine and transaxle to a frame and that allows interchangeability of components. It would be desirable to provide a mounting mechanism that also increases the ease with which the components can be removed from the vehicle for service, and that allows the engine and transaxle to be removed without requiring the two components be disconnected from one another for removal.

SUMMARY OF THE INVENTION

The preferred embodiment of the present invention provides a mechanism for mounting an engine and transaxle to a vehicle frame. The engine, transaxle, and belt arrangement that couples the engine with the transaxle are all carried by a horizontally extending plate-like member. The member extends longitudinally a substantial distance and is coupled to the vehicle via first and second coupling means. The second coupling means is longitudinally offset from the first coupling means such that the member acts as a lever arm for transmitting torque loads to the frame. Since the second coupling means is longitudinally spaced a substantial distance from the first coupling means, the concentrated load imparted to the frame due to driving torque in the transaxle is relatively small. Therefore, the frame member can be manufactured from a material such as plastic that may not be capable of withstanding high concentrated loads. The engine is carried by the member such that the engine's center of gravity is positioned in general vertical alignment with the axle, such that a large portion of the weight of the engine is transferred to the ground via the rear wheels, rather than to the vehicle frame. The member can be removed from the vehicle frame without disconnecting the engine from the transaxle, such that the removal process is facilitated. The engine and transaxle can be removed from the rest of the vehicle as a single unit or module. The member must be unbolted from the frame, and the vehicle lifted and walked forwardly from the module. The frame is a relatively light material, such that the removal of the frame from the module can readily be accomplished. Access is thereby provided for servicing the engine or transaxle.

DESCRIPTION OF THE PREFERRED EMBODIMENT

Figure 1:
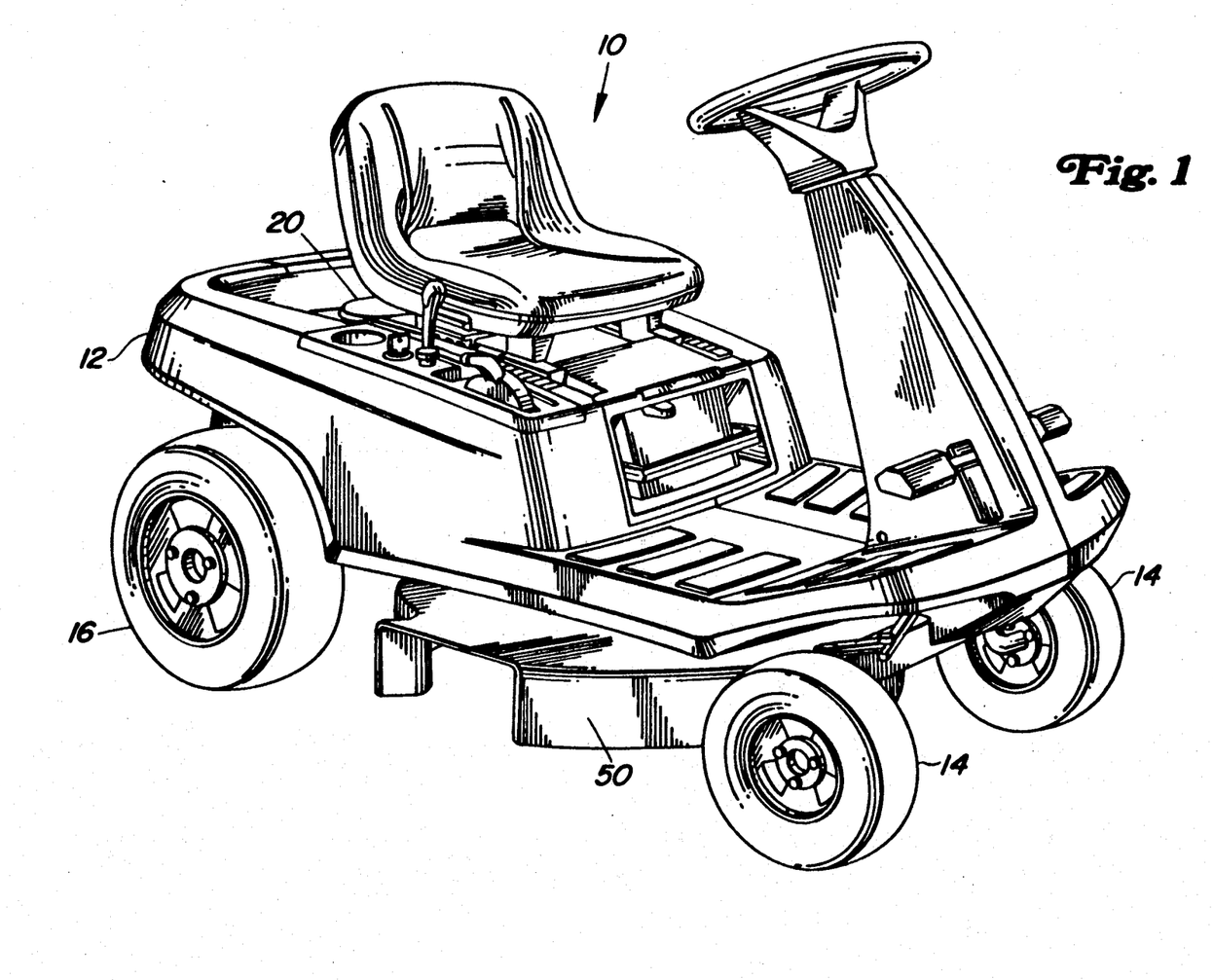
FIG. 1 illustrates a vehicle with which the preferred embodiment of the present invention may be used.

Referring now to FIG. 1, there is shown a vehicle 10 with which the preferred embodiment of the present invention may be used. The vehicle 10 is provided with a frame 12 manufactured from a plastic or composite material. Ground engaging front wheels 14 support and steer the vehicle 10, and rear driven wheels 16 act to propel the vehicle 10 forwardly or rearwardly.

Figure 2:
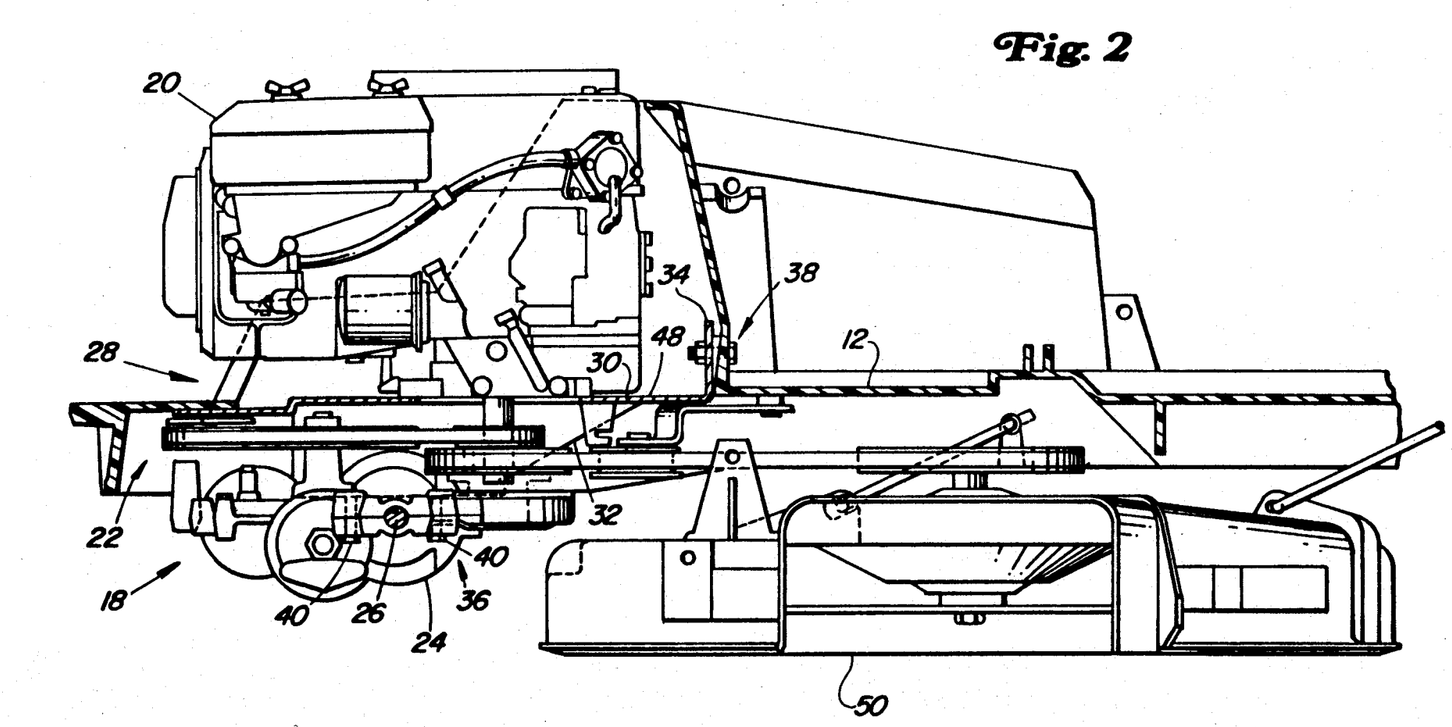
FIG. 2 is a side view of the preferred embodiment fully assembled.

A drive mechanism 18, as best seen in FIG. 2, is provided by the preferred embodiment of the present invention for supplying power to the driven wheels 16. A power source or engine 20 is carried at the rear of the vehicle 10. A belt and pulley arrangement 22 operatively connects the engine 20 with a transaxle 24. The transaxle 24 contains gears and/or a hydrostatic drive, a differential, and an axle 26 for transmitting rotational power from the engine 20 to the driven wheels 16.

Figure 3:
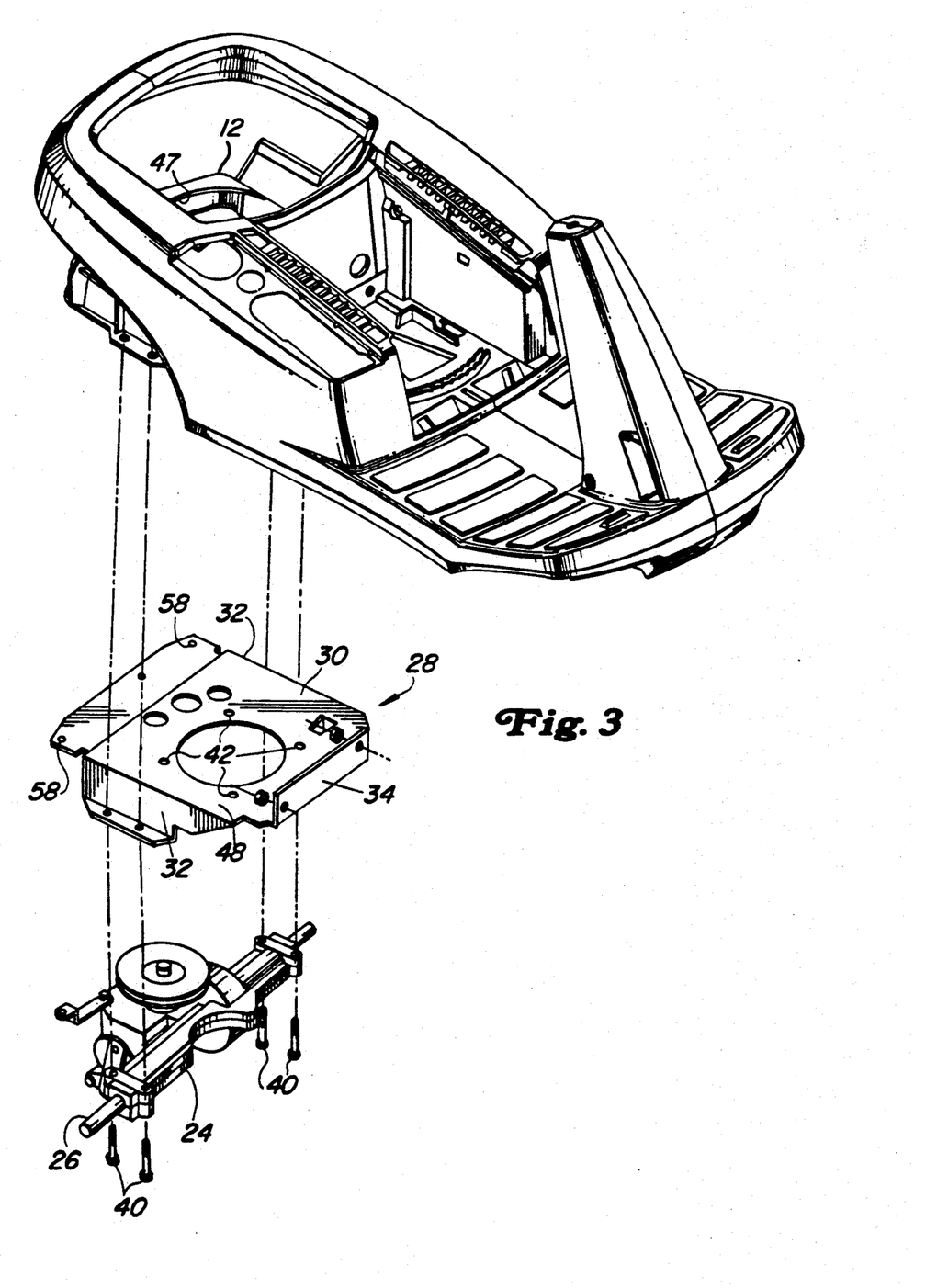
FIG. 3 is an exploded perspective view of the vehicle, plate member and transaxle according to the preferred embodiment with the engine not shown.
Figure 4:
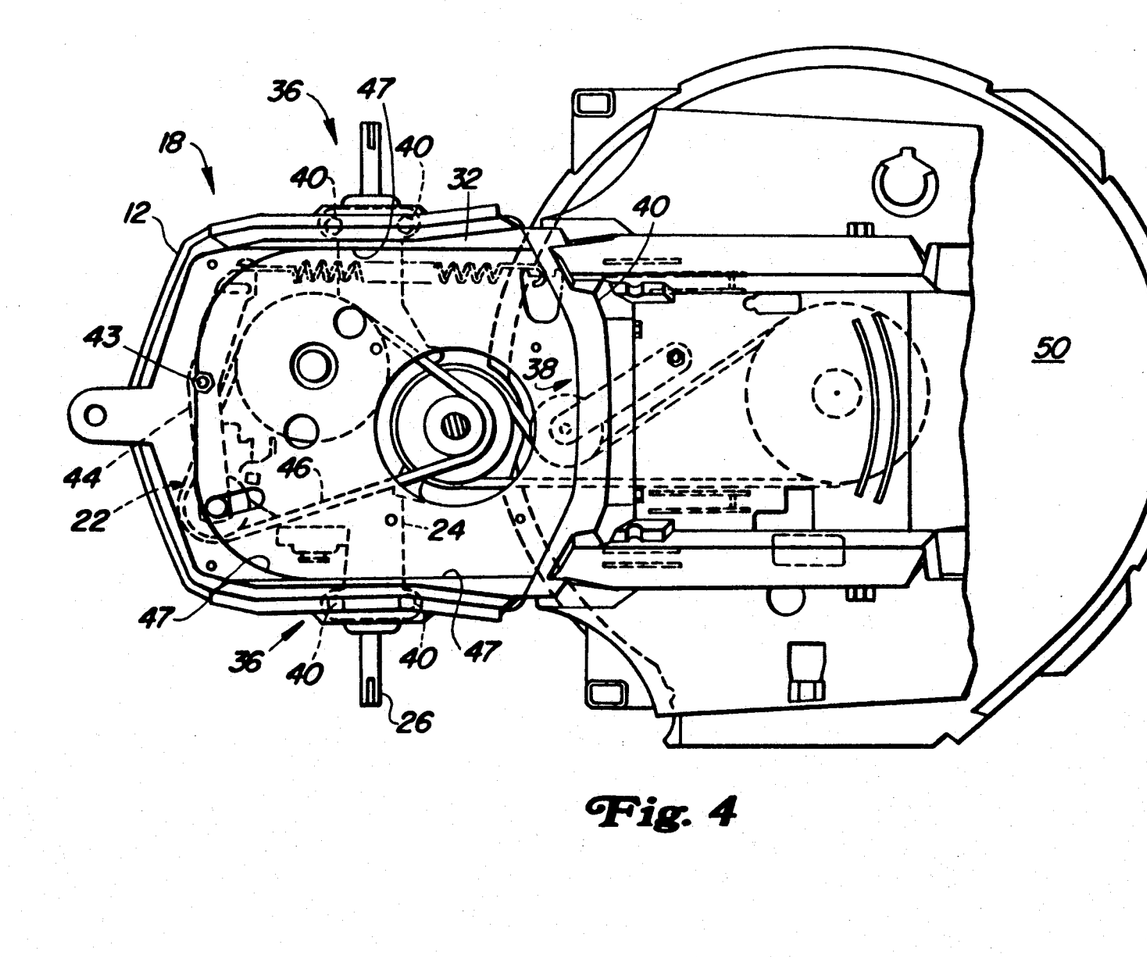
FIG. 4 is a plan view of the present invention.
Figure 5:
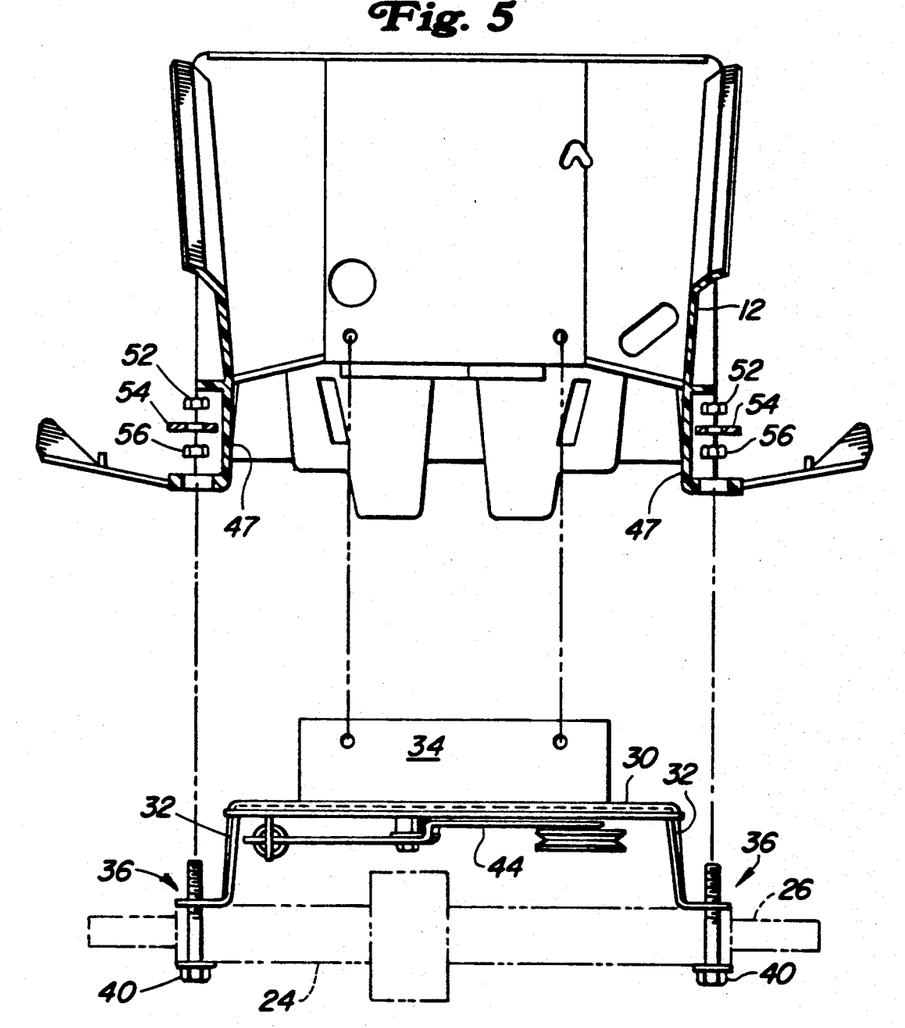
FIG. 5 is a sectional exploded view from the rear of the preferred embodiment.

A mounting mechanism 28, as seen in FIGS. 2-5, is also provided according to the preferred embodiment for coupling or mounting the drive mechanism 18 to the vehicle frame 12. A generally horizontally disposed plate-like member 30 is provided for mounting the engine 20, transaxle 24, and pulley arrangement 22 to the vehicle frame 12. The member 30 includes first and second bent or angled portions 32 and 34, that act to stiffen and strengthen the member 30. The member 30 is coupled with the frame 12 via first and second coupling means 36 and 38. The first coupling means 36 includes two pair of bolts 40 that are located along the outer edge portions of the frame 12 near the axle 26. The first coupling means 36 couples the first angled portions 32 of the member 30 with the vehicle frame 12. The second coupling means 38 couples the second angled portion 34 of the member 30 with the vehicle frame 12 near the centerline of the vehicle 10. The engine 20 is bolted to the plate member 30 at a plurality of locations 42, best seen in FIG. 3. The transaxle 24 is coupled to the plate member 30 via the bolts 40 of the first coupling means 36. A rear attachment bolt 43 is also provided that couples the transaxle to the plate and transmits torque loads from the transaxle 24 to the plate member 30. The rear attachment bolt 43 also acts to pivotally carry a clutch arm 44 that can be operatively pivoted during operation to release driving tension in the belt 46. FIGS. 3 illustrate the vehicle frame 12 with the plate member 30, engine 20 and transaxle 24 removed. The frame 12 defines a generally open compartment 47 as best seen in FIGS. 3, 4 and 5, within which the engine 20, transaxle 24 and plate member 30 are situated during operation.

Figure 6:
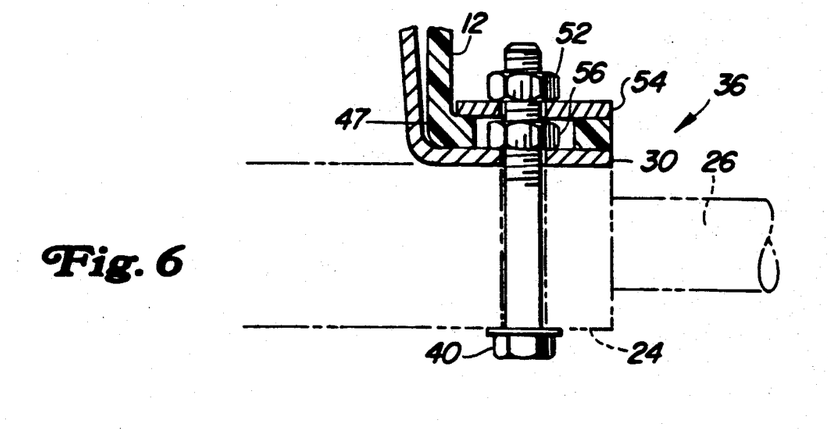
FIG. 6 illustrates the coupling between the vehicle frame, transaxle, and plate member.

FIG. 6 illustrates the first coupling means 36. The bolts 40 couple the transaxle 24 to the plate member 30, and also act to secure the plate member 30 against the frame 12. A nut 52 threaded onto each bolt 40 presses an abutment member 54 against the frame 12. A spacer member 56 is also threaded onto each bolt 40. The spacer 56 acts to limit the degree to which the frame 12 can be compressed. The frame material being compressed is therefore prevented from being squeezed out from between the plate member 30 and the abutment member 54. The frame structure thereby provides a firm structure to which the plate member 30 can be mounted. The spacer 56 also acts to couple the plate member 30 to the transaxle 24 such that the transaxle 24 remains securely fixed with the plate member 30 when the frame 12 is removed. The abutment members 54 act to spread force loads and thereby decrease the concentrated loads transferred from the transaxle 24 and plate member 30 to the vehicle frame 12.

Next, the operation of the preferred embodiment of the present invention will be discussed. During normal operation, the engine 20 is carried by the plate member 30 in such a position that the engine's center of gravity is positioned generally directly above the axle 26. The vertical alignment of the engine's center of gravity with the axle 26 acts to transfer the weight of the engine 20 downwardly to the ground via the plate member 30, transaxle 24, axle 26 and ground engaging wheel 16. If the engine's center of gravity were horizontally offset from the axle 26, the engine 20 would tend to pivot about the axle 26 under the force of its own weight. This pivoting tendency would place a load on the frame 12 associated with the weight of the engine 20, such that the frame 12 would have to be relatively strong to withstand the engine weight loading. By positioning the center of gravity of the engine 20 generally directly above the axle 26, the weight of the engine 20 is generally not borne by the frame 12, but rather is transferred to the ground via the plate member 30, transaxle 24 and rear ground engaging wheels 16. Since concentrated loads on the frame 12 resulting from the weight of the engine 20 are reduced or eliminated by the preferred embodiment, a relatively inexpensive frame structure that may not be capable of withstanding high concentrated loads corresponding to engine weight can therefore be employed.

Vehicle frames must also withstand another type of force loading. When the vehicle 10 accelerates forwardly, the engine 20 transmits rotational power to the transaxle 24, which then transfers the rotation to the driven wheels 16. As the rotational force is being applied to the wheel 16, an equal and opposite force is being applied to the vehicle 10. If the vehicle 10 accelerates forwardly, for example, the torque load on the vehicle 10 will urge the vehicle 10 to pivot upwardly and rearwardly about the axle 26. If the vehicle 10 accelerates rearwardly, the torque load on the vehicle 10 will urge the vehicle 10 to pivot downwardly about the rear axle 26. The equal and opposite torque load or twisting load will be transferred to the frame 12 through the mechanism 28 that couples the transaxle 24 to the vehicle frame 12.

The transaxle 24 according to the preferred embodiment is coupled to the plate member 30, and therefore the torque load created at the transaxle 24 that must be absorbed by the vehicle 10 is first transferred to the plate member 30. The plate member 30 is thereby urged to pivot about the axle 26. When accelerating forwardly for example, the plate member 30 will be urged to pivot upwardly about the axle 26, such that the second angled portion 34 located at the front of the plate member 30 is forced upwardly. Therefore, the second coupling means 38 will be urged to pivot upwardly and rearwardly about the axle 26, and will therefore exert a force on the frame 12 to pivot upwardly at this location. The portion of the frame 12 to which the second coupling means 38 is attached must therefore be sufficiently strong to withstand this concentrated load, or else the frame 12 will break or tear away from the plate member 30.

However, the present invention according to the preferred embodiment employs a lever principle to reduce the amount of force transferred from the plate member 30 to the frame 12. The lever principle teaches that a torque force having a given magnitude may be applied to a body by the application of a force at a distance from a pivot axis. A torque force having the same magnitude can be created by applying a smaller amount of force at a greater distance from the pivot axis. The second coupling means 38 according to the preferred embodiment is located a distance forwardly from the axle 26 about which the plate member 30 is urged to pivot, such that a lever arm 48 is created. Since the frame 12 is holding the plate member 30 from pivoting at a location longitudinally extended from the plate member's axis of rotation, i.e. from the axle 26, the force required to prevent pivoting is relatively small. In other words, since the lever arm 48 created by the plate member 30 extends a substantial distance from the plate member's axis of rotation, i.e. the rear driven axle 26, the force being transferred through the second coupling means 38 from the plate member 30 to the frame 12 is relatively small. The farther the plate member 30 extends forwardly, the smaller will be the concentrated load transferred from the plate member 30 to the frame 12 through the second coupling means 38. The lever arm 48 established by the preferred embodiment of the present invention therefore reduces the concentrated load transferred to the frame 12 that results from driving torque being applied to the wheels 16. The preferred embodiment thereby allows the use of a frame 12 manufactured from a relatively inexpensive material such as plastic that may not be capable of withstanding relatively large and concentrated force loads.

The rear portion of the plate member 30 is adapted to carry a container (not shown) that would catch grass cut by a mower 50. The grass container would be mounted to the plate member 30 to transfer the weight of the container and its contents to the plate member 30. The weight of the container is therefore generally transmitted through the plate member 30 and transaxle 24 to the ground engaging wheels 16, rather than directly to the vehicle frame 12. Relatively large concentrated loads associated with the use of a grass container would therefore be transmitted first to the plate member 30, and then to the frame 12 via the first and second coupling means 36 and 38. The frame 12 can therefore be manufactured from a material such as plastic that may not be capable of withstanding large concentrated loads that would result from mounting a container to the vehicle frame 12.

According to the preferred embodiment, the engine 20, transaxle 24, and the belt arrangement 22 extending therebetween are all coupled with the plate member 30 during operation. The plate member 30 therefore acts as the means for coupling the engine 20, transaxle 24 and belt arrangement 22 with the vehicle frame 12. The three components 20, 22, and 24, and the plate member 30 that carries them therefore act as a module that can be removed as a single unit to service any of the components 20, 22 and 24. To remove the module from the vehicle 10 for service, the plate member 30 must be unbolted from the frame 12. Linkages (not shown) extending between the module and the controls at the front of the vehicle 10 must be uncoupled and removed. The fuel line, electrical lines, throttle cable and muffler are then uncoupled from the module. The frame 12 can then be lifted upwardly and shifted forwardly from the module. The frame 12 is made of a light-weight plastic material such that the rear of the frame 12 can easily be lifted from the module and walked forwardly to expose the module components 20, 22 and 24 for service. The three components 20, 22 and 24 are not required to be uncoupled from each other during the process of removal, thereby increasing the ease with which access can be gained to the various components. Since the components remain operatively linked after removal, the components can be operated and tested before reattaching the components to the vehicle frame 12. To reattach the module to the frame 12, the frame 12 is wheeled rearwardly over the module, and lowered onto the first angled portions 32 of the plate member 30. The plate member 30 can then be bolted to the frame 12 at the first and second angled portions 32 and 34.

Similarly, the transaxle 24, engine 20 and module plate 30 can be sub-assembled off-line during the process of manufacture and therefore can be separately tested before being attached to the vehicle frame 12.

The engine 20 and transaxle 24 are each coupled to the plate member 30, and are connected by the belt arrangement 22 that extends therebetween. A variety of different types and sizes of engines and transaxles can be coupled with the plate member 30 without requiring modification to the frame 12. Since frames having identical design can accommodate a plurality of different engines and transaxles, an entire line of tractors can be manufactured using the same frame design. The cost of tooling and manufacturing a variety of different frame designs that would accommodate various sizes and types of components is therefore eliminated.

The preferred embodiment of the present invention provides optional rear attachment points 58 formed in the plate member 30. The rear portion of the frame 12 can be bolted to the plate member 30 at the optional attachment points 58 to add rigidity to the rear of the frame 12. When the frame 12 is fixed or bolted to the plate member 30 at the optional attachment points, a portion of the torque load created by the transaxle 24 will be transmitted from the plate member 30 to the rear portion of the frame 12 via the optional attachment points 58. However, since the rear portion of the frame 12 will tend to flex, it will absorb only a relatively small portion of the torque load, and the majority of the torque load will be transferred to the frame 12 via the second coupling means 38.

I claim:

1. A mechanism, comprising:

a vehicle having a frame and at least one driven wheel, a power source for driving said at least one driven wheel, a transaxle for transferring power from the power source to said at least one driven wheel and including an axle coupled with said at least one driven wheel, said transaxle producing a torque load on the vehicle when power is transferred to said at least one driven wheel, a member coupled to the frame, said power source and transaxle being coupled with and supported by the member, a first coupling means for coupling the member with the frame, a second coupling means for coupling the member with the frame at a location longitudinally offset a substantial distance from the first coupling means for transferring torque force to the frame a substantial distance from the first coupling means.

2. The invention of claim 1 wherein said member extends a substantial distance longitudinally from the first coupling means to act as a lever arm for transferring the torque force through the second coupling means and into the frame with a relatively small force.

3. The invention of claim 1 wherein the power source is coupled with the member, and the center of gravity of the power source is generally vertically aligned with the axle to reduce the torque transferred to the frame associated with the weight of the power source.

4. The invention of claim 1 and further including means operatively connecting the power source with the transaxle, said connecting means being carried by the member, and said member, power source, transaxle and connecting means is removable from the frame as a single unit with the power source remaining operatively connected with the transaxle.

5. The invention of claim 4 wherein the connecting means further comprises a belt and pulley mechanism.

6. The invention of claim 1 wherein the first coupling means is positioned at a location generally vertically aligned with the axle.

7. The invention of claim 1 wherein the member further comprises a plate-like structure.

8. The invention of claim 1, wherein the member further includes a first angled portion that acts to stiffen and strengthen the member, and said first coupling means couples the first angled portion of the member with the frame.

9. The invention of claim 1, wherein the member further includes a second angled portion that acts to stiffen and strengthen the member, and said second coupling means couples the second angled portion of the member with the frame.

10. The invention of claim 1, wherein the member further comprises a generally horizontally extending plate member that includes a first angled portion for stiffening and strengthening the plate member, the first coupling means couples the first angled portion of the plate member to the frame.

11. The invention of claim 1, wherein the member further comprises a generally horizontally extending plate member that includes a second angled portion for stiffening and strengthening the plate member, the second coupling means couples the second angled portion of the plate member to the frame.

12. The invention of claim 11, wherein the first coupling means is positioned at a location generally vertically aligned with the axle.

13. A mechanism, comprising:

a vehicle having a frame and at least one driven wheel, a power source for driving said at least one driven wheel, a transaxle for transferring power from the power source to said at least one driven wheel and including an axle coupled with said at least one driven wheel, said transaxle producing a torque load on the vehicle when power is transferred to said at least one driven wheel, a member coupled to the frame, said power source and transaxle being coupled with and supported by the member, said member extending a substantial distance longitudinally, said power source being coupled with the member with the center of gravity of the power source in general vertical alignment with the axle to reduce the torque transferred to the frame associated with the weight of the engine, a first coupling means for coupling the member with the frame, a second coupling means for coupling the member with the frame at a location longitudinally offset a substantial distance from the first coupling means for transferring torque force to the frame a substantial distance from the first coupling means, said longitudinally extending member acting as a lever arm for transferring the torque force through the second coupling means and into the frame with a relatively small force.

14. The invention of claim 13 and further including means operatively connecting the power source with the transaxle, said connecting means being carried by the member, and said member, power source, transaxle and connecting means being removable from the frame as a single unit with the power source remaining operatively connected with the transaxle.

15. The invention of claim 14 wherein the connecting means further comprises a belt and pulley mechanism.

16. The invention of claim 13 wherein the member further comprises a plate-like structure.

17. The invention of claim 13, wherein the member further includes a first angled portion that acts to stiffen and strengthen the member, and said first coupling means couples the first angled portion of the member with the frame.

18. The invention of claim 13, wherein the member further includes a second angled portion that acts to stiffen and strengthen the member, and said second coupling means couples the second angled portion of the member with the frame.

19. A mechanism, comprising:

a vehicle having a frame and at least one driven wheel, a power source for driving said at least one driven wheel, a transaxle for transferring power from the power source to said at least one driven wheel and including an axle coupled with said at least one driven wheel, said transaxle producing a torque load on the vehicle when power is transferred to said at least one driven wheel, a generally horizontally extending plate-like member coupled to the frame, said power source and transaxle being coupled with and supported by the member, said member extending a substantial distance longitudinally and including first and second angled portions for stiffening and strengthening the member, said power source being coupled with the member for positioning the center of gravity of the power source in general vertical alignment with the axle to reduce the torque transferred to the frame associated with the weight of the engine, means operatively connecting the engine with the transaxle, said connecting means being carried by the member, a first coupling means for coupling the first angled portion of the member to the frame, a second coupling means for coupling the second angled portion of the member to the frame at a location longitudinally offset a substantial distance from the first coupling means for transferring the torque force to the frame a substantial distance from the first coupling means, said longitudinally extending member acting as a lever arm for transferring the torque force to the frame with a relatively small force via the second coupling means, and said member, engine, transaxle and connecting means being removable from the frame as a single unit with the engine remaining operatively connected with the transaxle.

* * * * *